Sept. 1, 1936.   R. H. LAWSON   2,052,777
SINKER REVERSE PLATING MECHANISM
Filed July 29, 1929   10 Sheets-Sheet 1

Inventor:
Robert H. Lawson,
by Emery Booth Varney Townsend
Attys

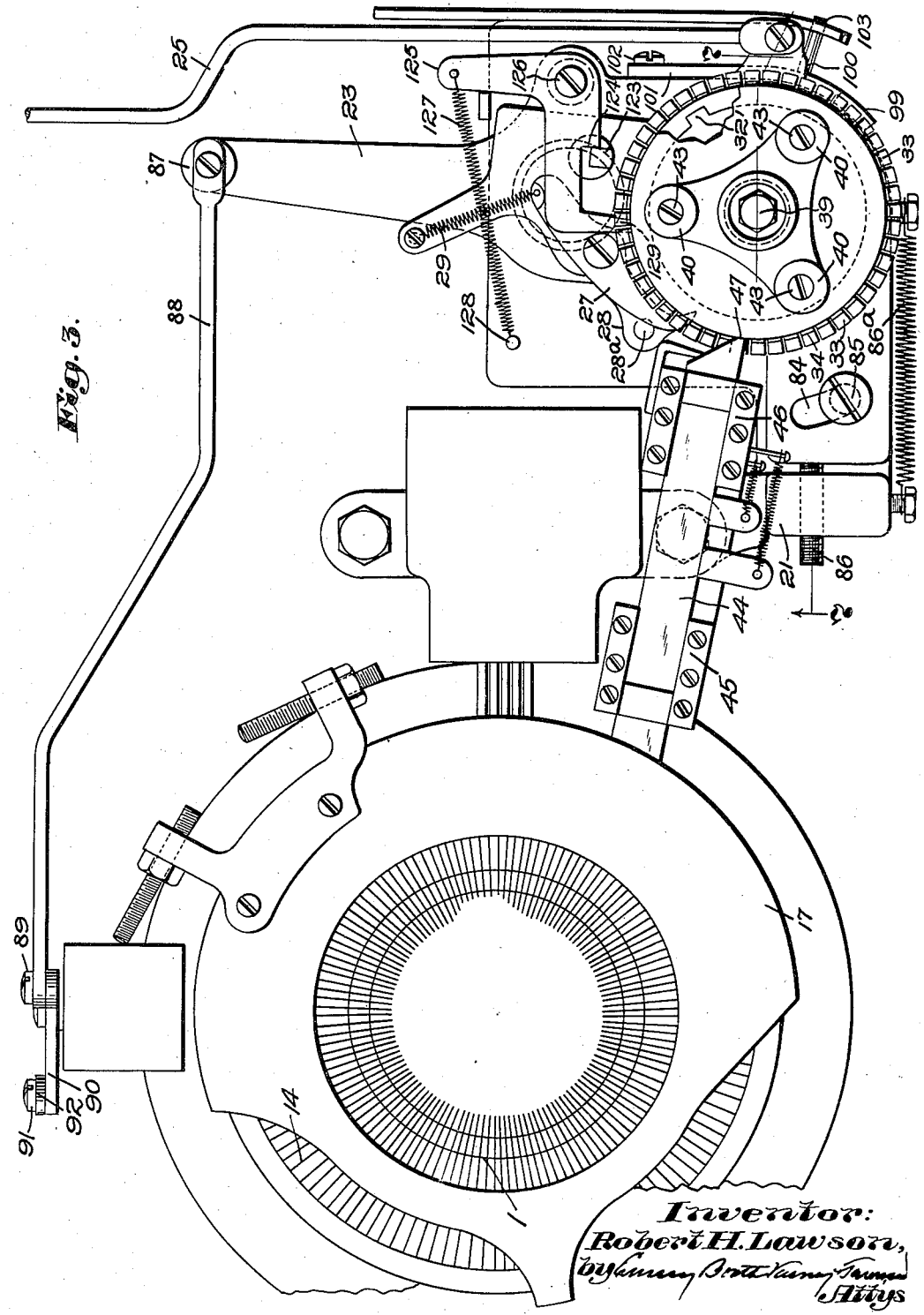

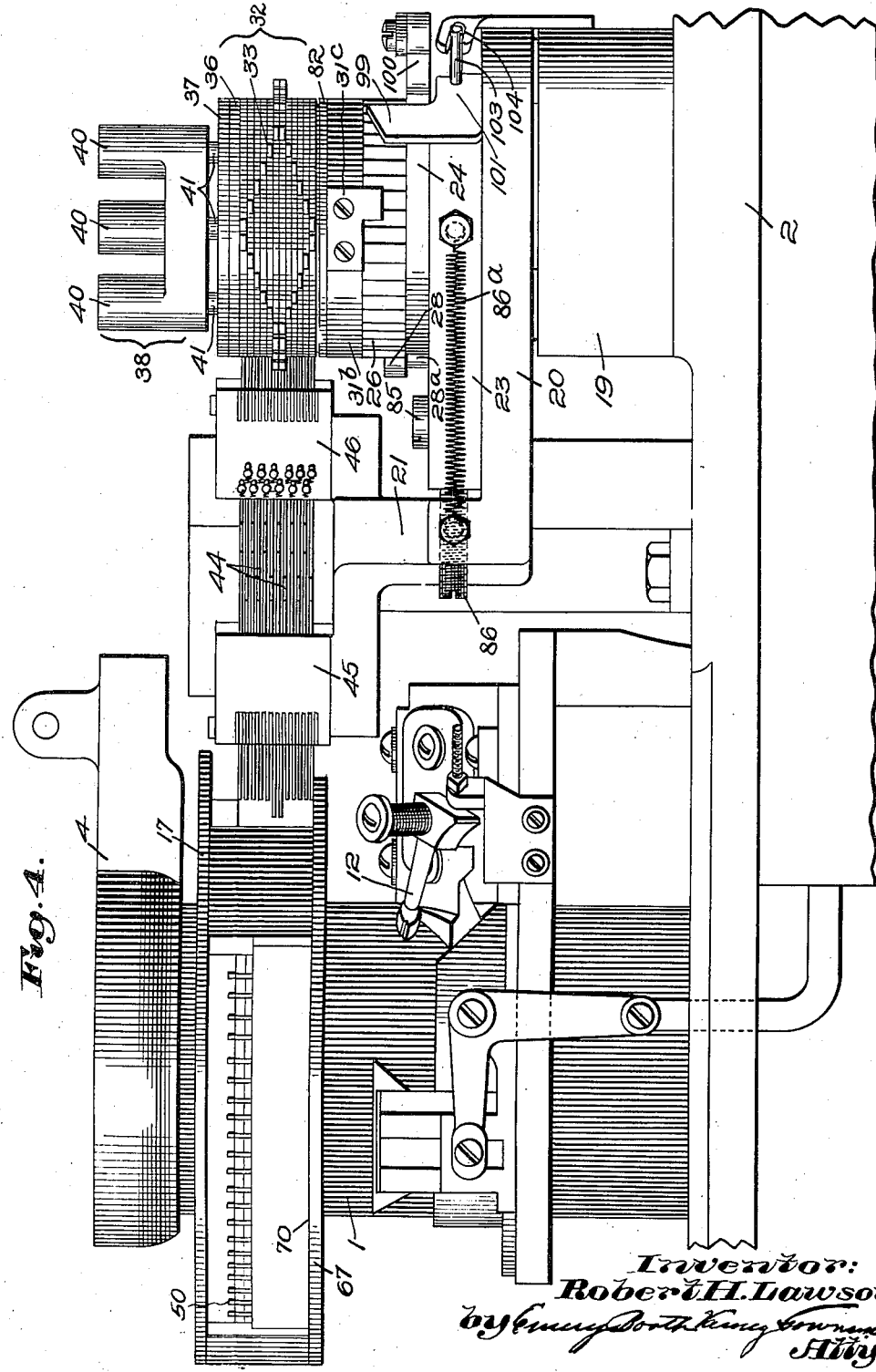

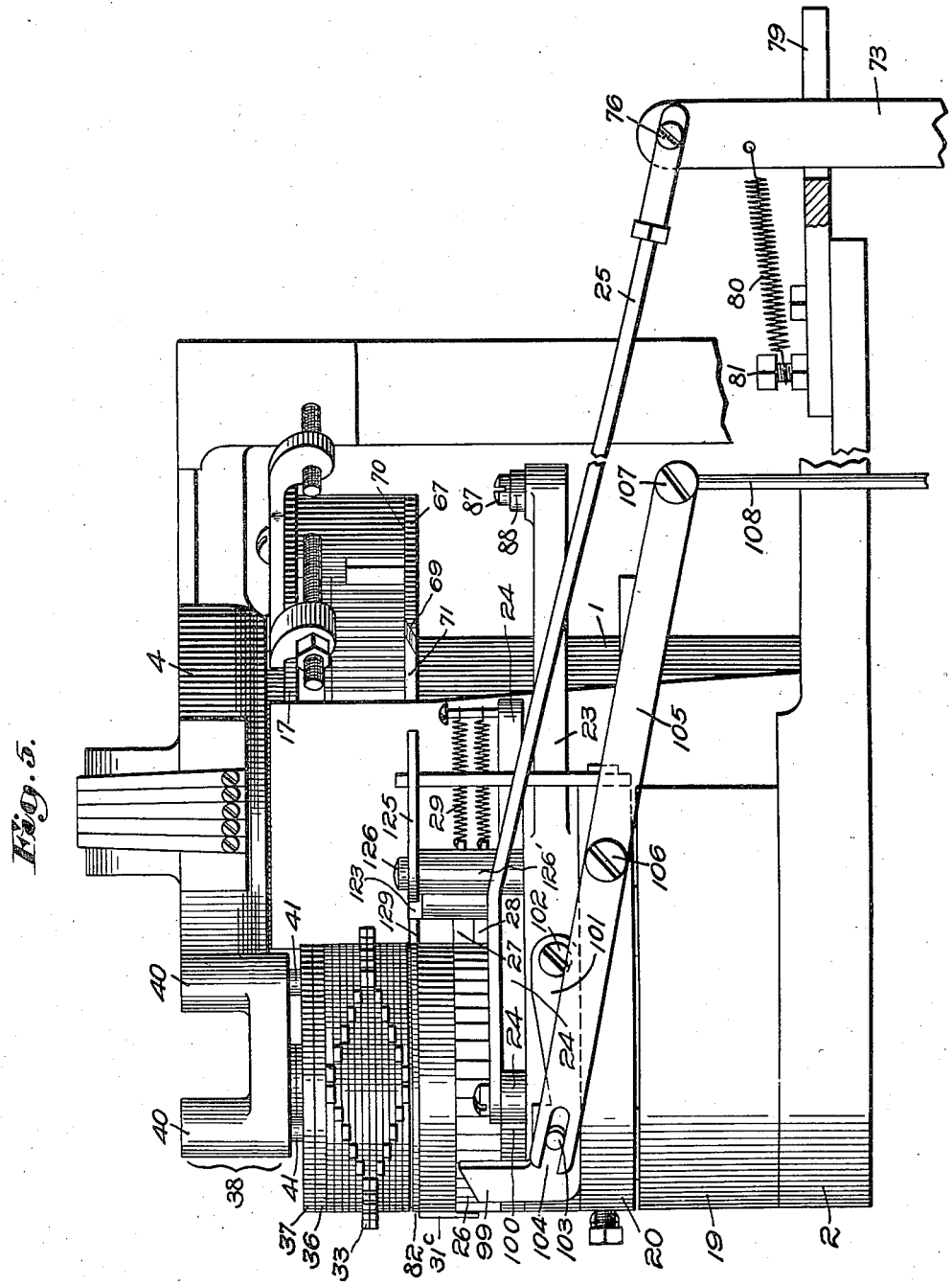

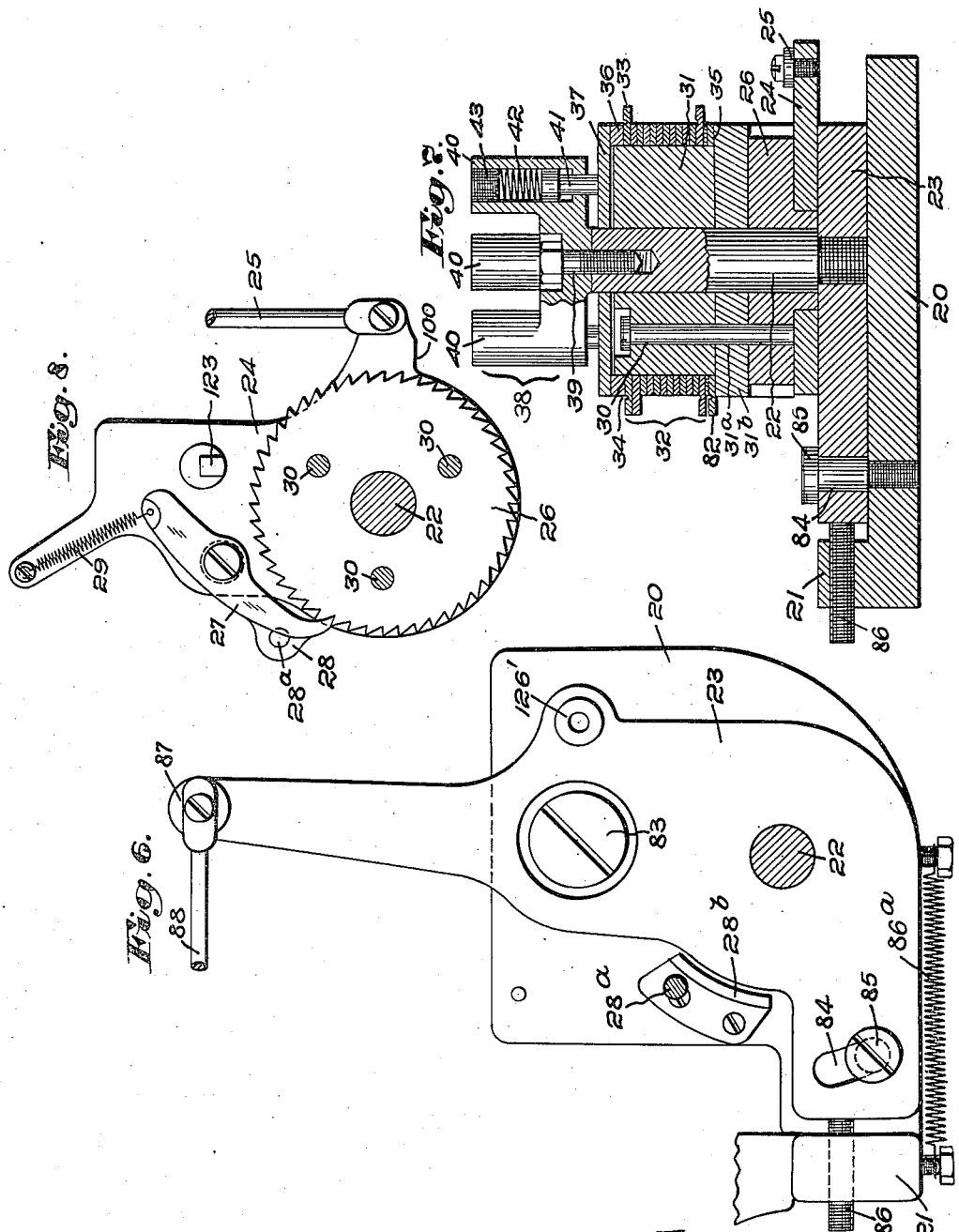

Sept. 1, 1936.  R. H. LAWSON  2,052,777

SINKER REVERSE PLATING MECHANISM

Filed July 29, 1929  10 Sheets—Sheet 7

Inventor:
Robert H. Lawson,
Attys

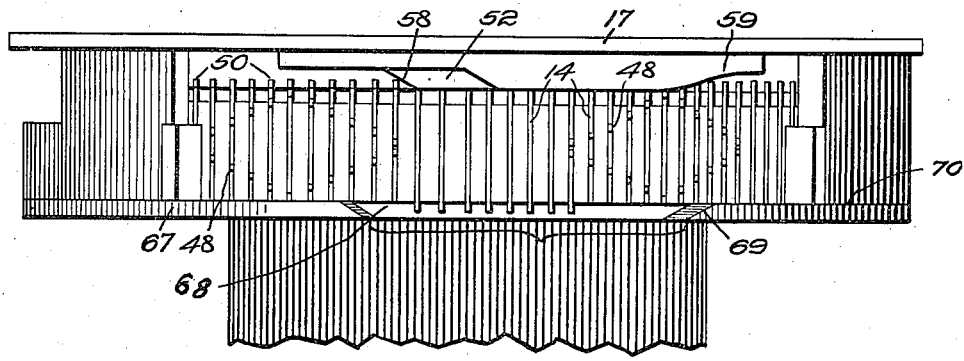
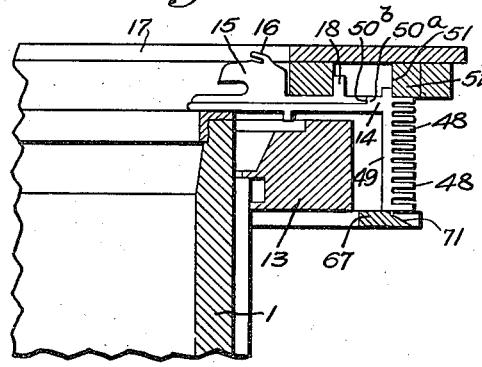
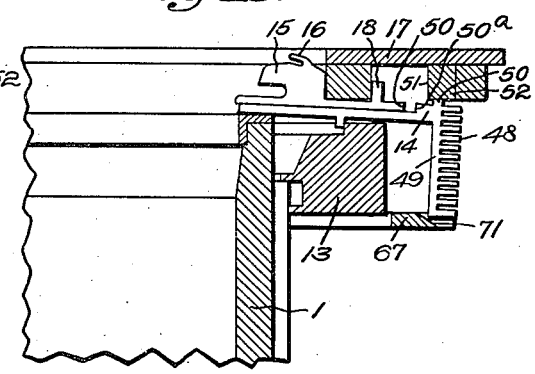
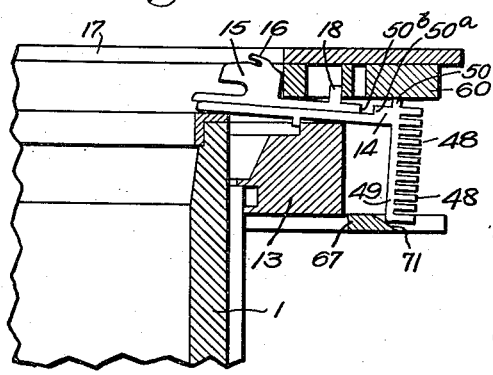
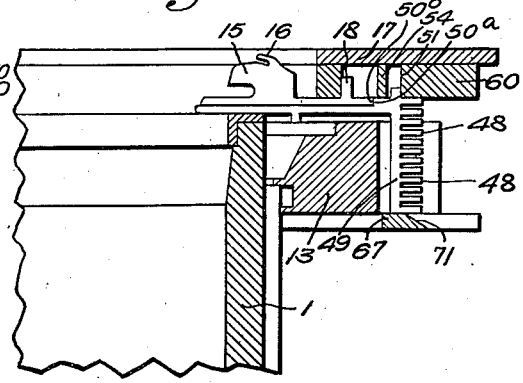

Sept. 1, 1936.  R. H. LAWSON  2,052,777
SINKER REVERSE PLATING MECHANISM
Filed July 29, 1929    10 Sheets-Sheet 9

Inventor:
Robert H. Lawson,
by Emery, Booth, Varney, Townsend
Attys

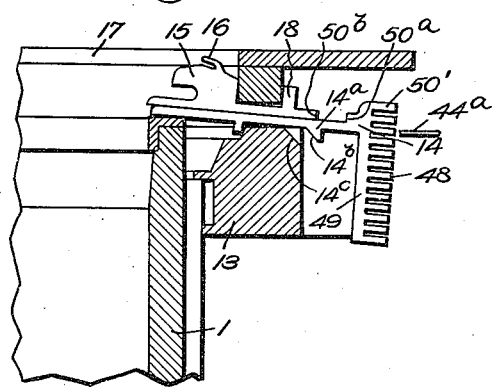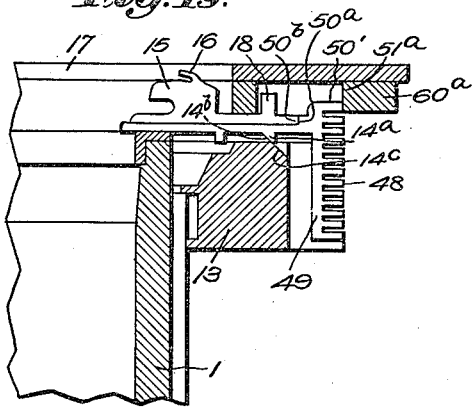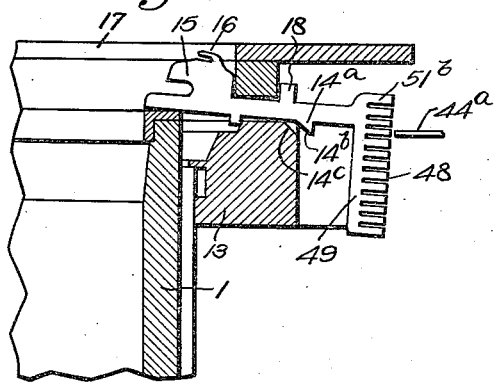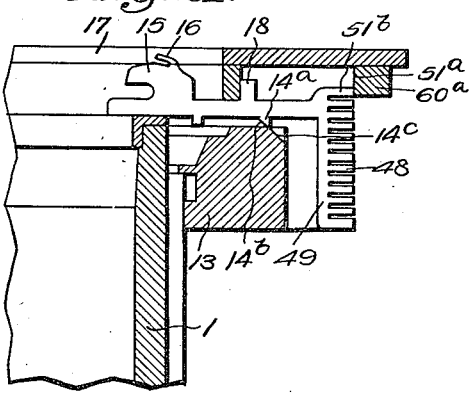

Patented Sept. 1, 1936

2,052,777

UNITED STATES PATENT OFFICE 2,052,777

SINKER REVERSE PLATING MECHANISM

Robert H. Lawson, Pawtucket, R. I., assignor to Hemphill Company, Central Falls, R. I., a corporation of Massachusetts Application July 29, 1929, Serial No. 381,925

22 Claims. (Cl. 66—108)

This invention relates to mechanism for and process of effecting reverse plating by sinker mechanism.

In order that the principle of the invention may be readily understood, I have disclosed certain embodiments of the mechanism of my invention in the accompanying drawings, wherein:—

Fig. 2 is a left hand end elevation thereof;

Fig. 2a is a detail in elevation of a bell crank and connections for conveying movements to be referred to;

Fig. 3 is a plan view of the knitting head and of the mechanism of my invention directly associated therewith;

Fig. 4 is a front elevation of the head of the machine and the immediately associated mechanism of my invention;

Fig. 5 is a left hand end elevation of the head of the machine and the immediately associated parts;

Fig. 6 is a plan view, partly in horizontal section, of means for throwing the reverse plating mechanism out of action for the heel and the toe;

Fig. 7 is a vertical section, on the line 7—7 Fig. 3, of patterning means for controlling the reverse plating mechanism;

Fig. 8 is a plan of the means for rotating the drum of the said patterning mechanism;

Fig. 11 is a side elevation looking toward the knitting head from the right hand side in Fig. 3;

Figs. 12 and 13 are details in vertical section showing the selected and non-selected positions of a sinker at a certain point in the rotation of the knitting head;

Figs. 14 and 15 are similar views at a different position in the rotation of the knitting head;

Figs. 18 and 19 are detail vertical sections showing in two different positions a modified construction of jack; and Figs. 20 and 21 are similar views of still another modified construction.

Figure 1:
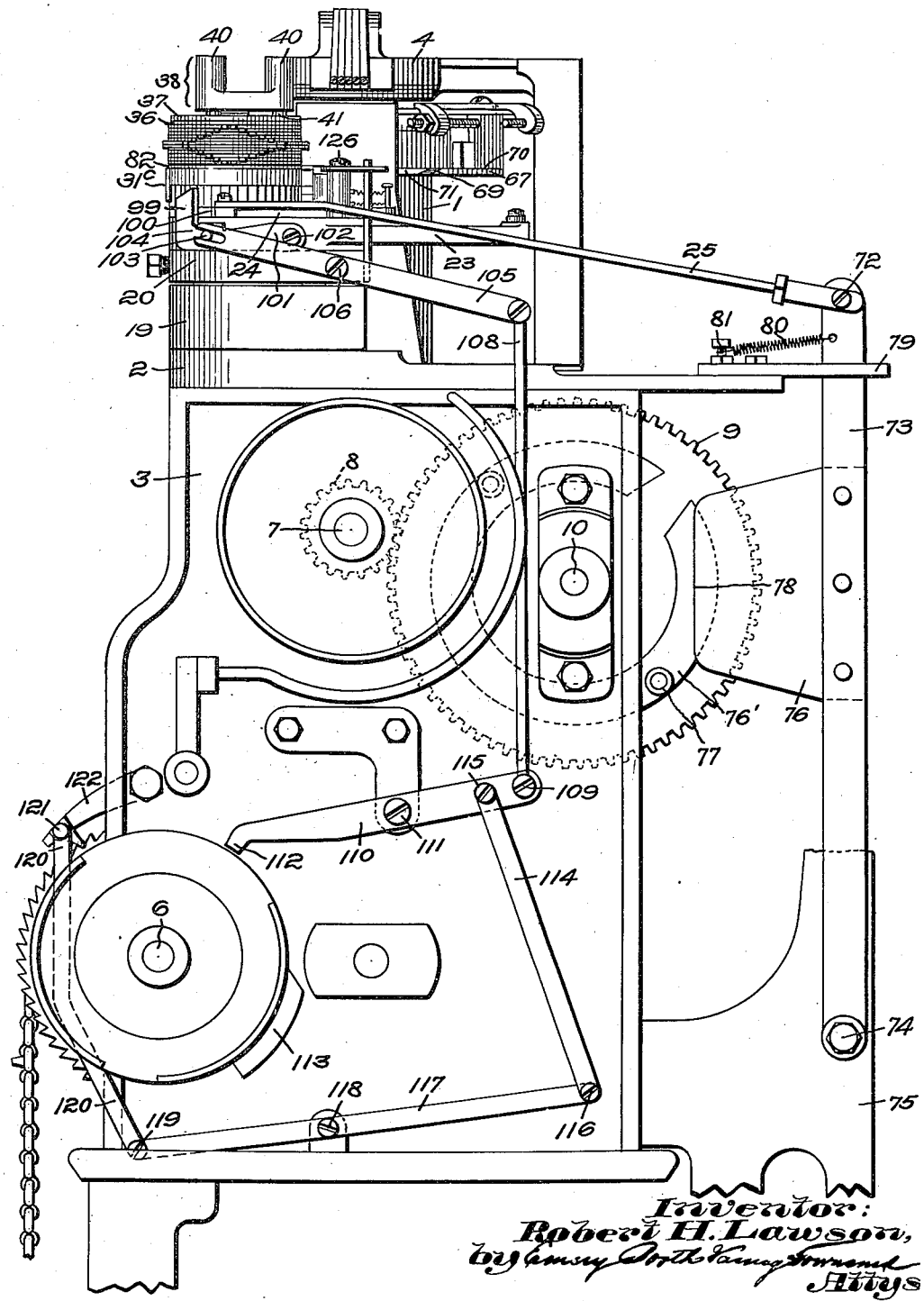
Fig. 1 is a right hand end elevation of a circular knitting machine having the mechanism of my invention applied thereto.

This invention relates to an improved means and method for effecting reverse plating by sinker action in the general way disclosed in my Patent Reissue No. 16,584, dated April 5, 1927, although it is clearly to be understood that the formation of the sinkers themselves may be varied as desired, and in fact those herein shown effect reverse plating over the back of the sinker, although this invention is not limited to any particular construction of the edge formation of the sinkers.

The two plating yarns are fed in a plating relation preferably with the yarn which is the outer yarn in normal plating relation, under greater tension than the other, as illustrated in Figs. 29 and 30 of the said reissue patent and as fully described therein, so that illustration thereof in this application is unnecessary. Whereas in the said patent, I have shown means consisting of two different cams for acting upon two different lengths of reverse plating sinker butts in the formation of patterns, I have in the present application shown what I here term "twelve steps" of sinker selection. In this manner elaborate patterns may be produced. Obviously the number of steps which I may employ may be more or less than twelve, and my invention is not limited in this respect.

Referring to the mechanism by which the fabric is produced, it is to be understood (assuming, for the purposes of description, the fabric is a hose or stocking knitted upon a circular machine of the independent needle type) that my invention may be applied to or embodied in various types of such circular knitting machine, but I have chosen to represent the same as applied to a machine of the well known Banner type disclosed in the patent to Joshua D. Hemphill, No. 933,443, dated September 7, 1909. In this type of machine the needle cylinder rotates while the knitting cams remain stationary, and although the machine herein disclosed is for the purpose of producing hosiery, it is obviously not limited to such class of work. I will, however, describe my invention as applied to a machine of such type without limiting it thereto excepting when expressly so stated in the claims.

Generally speaking, the machine includes a rotating needle cylinder 1 mounted upon a suitable table 2 constituting a part of the frame 3 of the knitting machine, and, as is customary in this type of machine, said cylinder is arranged to be rotated to form the leg and foot of the hose or stocking and to be reciprocated to form the heel and toe thereof. The means for effecting the rotary and reciprocating movements are substantially the same as those shown and described in the said Hemphill patent and, being well known, require no further description.

A plurality of yarn feeding elements is provided so as to feed not only the two yarns for plating but so as to feed such other yarns as may be required (as, for example, the yarn or yarns for producing the horizontal stripes, the yarn or yarns for the heel, the yarn or yarns for the toe, and the high splicing and sole reinforcing yarn). It will be unnecessary to show any of said yarn feeding elements and full disclosure thereof may be had by reference to my said Reissue Patent No. 16,584.

The machine is, as stated, of the independent needle type, and the needles are desirably latch needles. Therefore, in this embodiment of the invention, I employ a latch ring 4 (see Fig. 4) equipped with suitable binder mechanism (not here shown) and suitably controlled as by a link and lever mechanism desirably in the usual manner from cams upon or associated with the main pattern drum upon the shaft 6 (see Fig. 1).

The entire mechanism is driven from the main drive shaft 7 having thereon the usual pulleys and also having suitable gearing including the pinion 8 for driving the large gear 9 known as the "104" gear, which is mounted upon the shaft 10. From said main drive shaft is also driven in usual manner the quadrant 11 (see Fig. 2) whereby the machine is reciprocated during the knitting of the heel and toe. The machine is also provided with the usual narrowing pickers 12 and the usual widening picker mechanism 12'. The said pickers are desirably those of the Banner machine, and require no further description. The needle cylinder 1 is provided with the usual needle grooves wherein latch needles are mounted, in this embodiment of the invention. At the upper end of the needle cylinder is provided the web holder bed ring 13 having formed in its upper face, as usual, radial grooves corresponding in number to the number of needles, which may be of any suitable gauge but are desirably of a very fine gauge. In each of said radial grooves is mounted a jack 14 (hereinafter more fully described) and a sinker 15 superimposed thereupon, as clearly shown in Figs. 12, 13, 14 and 15.

While said sinkers may, as stated, be of any suitable construction, they are preferably all reverse plating sinkers, so that reverse plating may be effected at any wale as desired. While the shape or edge formation of the sinkers may be that shown in my Reissue Patent No. 16,584, or in other patents issued to me as a sole or joint inventor, they desirably have upper nibs 16 so constructed and arranged as to effect reverse plating over the backs of the sinkers, but which is explained in my Patent No. 1,785,899, dated May 13, 1930, and the file wrapper and contents thereof.

The said jacks and sinkers are capable of radial movements in their grooves, and are reciprocated therein by certain cams to be presently described. The cap ring 17 and the bed ring 13 (excepting as hereinafter pointed out) are or may be of usual construction. The said cap ring 17 has, formed in its under face, certain channels or pathways to receive the upwardly extending butts 18 of the entire series of web holders.

I will first describe the means herein shown for positioning and controlling the jacks and the sinkers, so that the latter may, as selected, be acted upon by the sinker cams, and to that end will refer particularly to Figs. 3 to 8 inclusive.

Upon a suitable casting 19 upon the frame (see Fig. 4) there is provided a bracket 20 having an upwardly extending portion 21, as shown, so as to support the various parts of the patterning or controlling mechanism. As shown in Fig. 7 a stud 22 is vertically supported in a horizontally positioned lever 23 to be hereinafter more fully referred to, and the function whereof is to throw the patterning means out of operation when going into the heel and the toe. Above said lever 23 is positioned a pawl carrier 24, shown also in Fig. 8, and operated through a rod 25, as will be hereinafter described. Above said pawl carrier is a ratchet 26 engaged preferably by two pawls 27, 28 held in position by springs 29 acting thereon, as clearly indicated in Fig. 8. The said ratchet 26 is made fast by three pins 30 to a drum or barrel 31 also surrounding the stud 22. Said pins pass through circumferential slots 31a in disk 31b carrying cam 31c (Fig. 4) to throw out the top pawl 27, leaving lower pawl 28 in action. By idling the top pawl 27 further rotation of the ratchet 26 is effected by the lower pawl 28 which thereby retimes the drum with its pattern discs so as to enable each stocking to be knitted with the same pattern, the said lower pawl acting as aforesaid only during the knitting of non-pattern fabric. Said disk 31b is therefore circumferentially adjustable. For heel and toe work, the lever 23 being moved out, both pawls 27 and 28 are out of action, the pawl 28 being thrown out by its depending pin 28a, engaging cam 28b on the bracket 20. The said drum or barrel 31 is adapted to receive and support any suitable number of disks 32 (here shown as twelve in number) in superposed relation, but the number of which can obviously be more or fewer than the indicated number. The said disks are desirably of metal and have projections or formations 33, most clearly shown in Fig. 3. Each of said formation is scored or notched as indicated at 34, so that those projections which are not needed for the pattern may be squarely broken off. I have found that unless said projections are scored or notched, they do not break off squarely with certainty. Each disk 32 is initially formed with all projections intact, and the projections or formations which are not needed for the particular pattern are broken off before or in assembling the parts. All the said disks 32, being notched at 32', Fig. 3, are held in position between a shoulder 35 upon the drum or barrel and an upper ring 36, against which latter is held a friction ring 37. Said friction ring is itself held in position, as herein shown, by a cup-like piece 38 secured by a central bolt 39 to the stud 22. The said cup-like piece 38 is provided with three sockets 40 in each of which is a pin or plunger 41 pressed downwardly against the upper face of the friction ring 37 by a coiled spring 42 above which is an abutment or screw 43 for compressing the spring 42.

The projections or formations upon the respective disks 32 act respectively upon a corresponding number of slides 44 (here shown as twelve in number) which are mounted for lengthwise movement in two housings or guide ways 45, 46, as most clearly shown in Figs. 3 and 4. Each of said slides has an outer pointed end 47, and the inner end of each of said slides is adapted to engage, if selected by the pattern, with a corresponding projection upon a jack or jacks in the radial groove of the sinker ring as already referred to.

Figure 17:
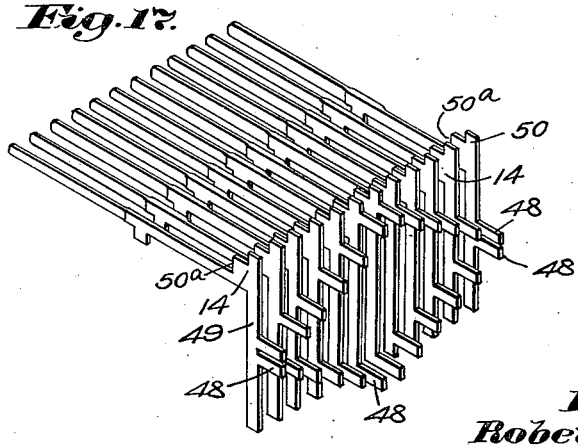
Fig. 17 is a perspective view showing the jacks according to one pattern.

Each of the jacks 14, when in use in the machine, is provided with a single or preferably a small plurality of end projections 48 (the number of which, of course, is determined by the pattern), but in Figs. 10 and 12 to 16 I have, for completeness of description and illustration, represented the jack as having twelve end projections integral with and radially extending in the plane of and from the depending stem or portion 49. It is to be understood that, according to the desired pattern, those projections 48 which are not needed are broken off. The pattern may call for one projection or more than one projection upon each such jack, and if more than one projection is called for, those may be two adjacent projections or they may be spaced more or less lengthwise the stem portion 49. In Fig. 17 I have indicated one pattern wherein each of the jacks is provided with two projections 48.

Figure 9:
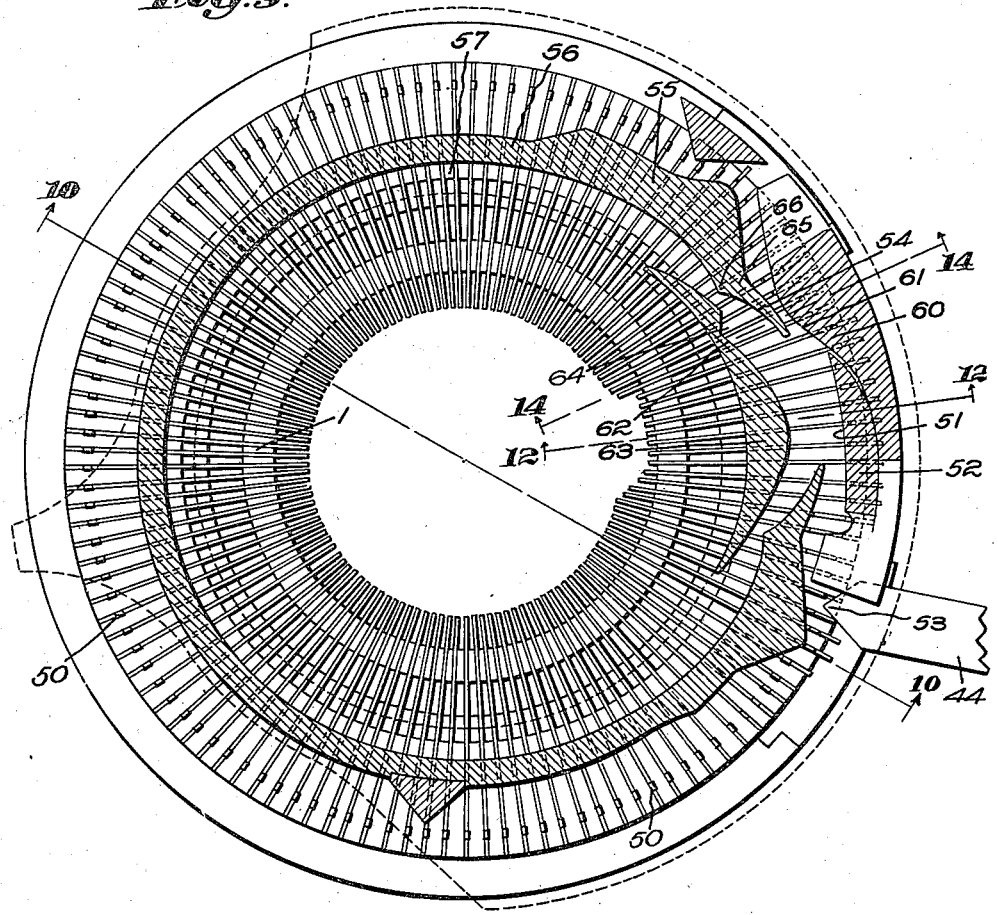
Fig. 9 is a plan view of the sinker controlling cams of the knitting head.
Figure 10:
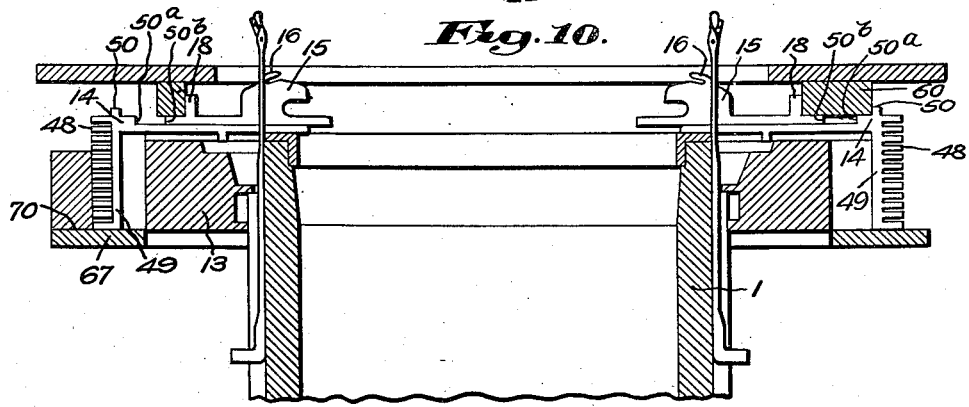
Fig. 10 is a vertical central section taken through the needle cylinder of the sinker cam carrier.
Figure 16:
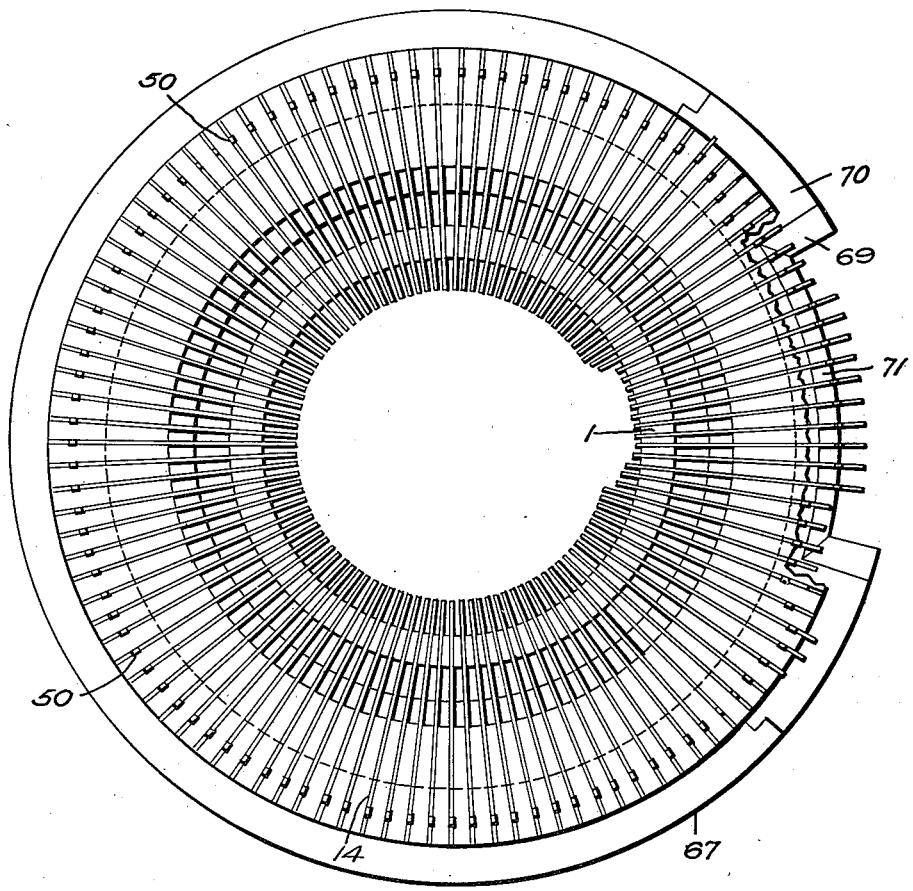
Fig. 16 is a plan view of the sinker ring.

The inward movement of a slide 44, by the selection determined by the pattern drum 31 and its disks 32, causes a like inward movement of the jack 14, a projection whereof has been engaged by such slide. Each jack is also provided with an upright butt 50, and also with a shoulder 50a, which (as shown in Figs. 12 and 15) is adapted, when moved inward, to engage with the end 50b of the sinker 15 superimposed in an edgewise position thereon, as already described. If a jack 14 is selected and moved inward, its butt 50 comes against the inner vertical edge 51 of the cam 52 of the sinker cam ring to be hereinafter referred to, but if said jack is not selected, then the butt 50 thereof rides along the under side of said cam 52, and the shoulder 50a of said jack does not come in contact with the end 50b of the sinker 15. The result is that the unselected sinkers function at the usual time (as will be described) and normal plating occurs thereat. The sinkers which are selected are moved inward at an earlier point and reverse plating occurs thereat, as will be understood from my said Reissue Patent No. 16,584. As shown most clearly in Fig. 9, the inner end of each slide 44 is pointed as indicated at 53. Each jack that is selected as described rides along the inner vertical face 51 of the cam 52 (viewing Fig. 9) and is by said cam edge moved radially inward sufficiently in advance of the casting off point and earlier than for normal plating (as will be further referred to), so as to effect reverse plating. If, however, the sinker is not selected for reverse plating, it is moved inward at the usual time by the cam edge 54 of the cam 55, succeeding which cam is the concentric portion 56 defining the outer wall of the pathway 57.

The single cam 52 is employed to move inwardly each and every jack that is selected. This arrangement of a single cam such as 52 to move whatever jack (or other element) is selected, is highly advantageous, as it does away with the objections to a plurality or multiplicity of so-called "flopper" cams, each intended to act upon selected elements having butts of a length particularly applying to the flopper cams respectively. The use of a plurality or multiplicity of flopper cams necessitates very delicate adjustments of such cams. In the present arrangement, however, the single cam 52 acts upon all the jacks which are selected, and said cam 52 may be fixed as in the disclosed construction, although my invention is not limited in this respect.

It is clearly to be understood that although I have described my invention as applied for reverse plating, my invention is not in its broad aspect limited thereto, as the same plan of selection may be employed in other connections, as, for example, in connection with drop stitch work as disclosed in co-pending application Serial No. 145,307, and it also may be used in connection with the formation of other fabrics.

The cam 52 has a downwardly beveled end 58, shown most clearly in Fig. 11, down and under which those jacks which are not selected ride, so as to take the position shown in Fig. 13. The opposite end of said cam 52 is upwardly beveled, as indicated at 59, so that the jacks may ride up under said beveled surface. Adjacent to and, it may be, contacting with the cam 52 is a cam 60 which is stationary, excepting that it is desirably circumferentially adjustable, so that the exact position of its inner edge 61 may be shifted if desired.

The jacks which are selected move along said inner edge 61 of the cam 60, and therefore move the corresponding sinkers 15 inward, so that the butts 18 are near the edge 62 of the cam 63, and are moved inwardly to their greatest extent at the point 64, thereby to effect reverse plating. Said point 64, it will be observed, is in advance of the greater part of the cam edge 65 leading to the point 66 which is substantially the casting-off point, and where those sinkers which are not selected by their jacks effect normal plating. In other words, those jacks which are selected by the means already described cause their sinkers to move inwardly at a relatively earlier point circumferentially considered than do those sinkers whose jacks are not selected, and whereat normal plating occurs.

Suitably supported under and preferably by the sinker cam ring construction, there is a ring 67 which is intended to support all the jacks entirely about the knitting head (in the manner shown in Figs. 12 to 15), excepting where it is broken away or is provided with a gap, as indicated at 68 (see Fig. 11), generally corresponding in position to the circumferential position of the cam 52. That is, where the stationary cam 52 acts to depress the non-selected jacks, such jacks pass along the gap 68, and then ride up the sloping edge 69 thereof onto the upper edge 70 of the ring 67, so as to be supported thereon until they or other non-selected jacks pass down the sloping edge 71 of said ring 67.

In Fig. 17, I have represented one only of a very large number of patterns which may be formed or produced by the use of my mechanism. It will, of course, be understood that reverse plating may, in accordance with my invention, be produced or effected at any stitch in any wale regardless of the production of normal plating or reverse plating at any other stitch of any preceding or succeeding course. Moreover, reverse plating areas may be but a single wale in width, and in practice are very sharply defined by the use of my invention. Great accuracy in the patterns is obtained by the mechanism of the invention, and this is largely due to the use of the single cam 52, which therefore acts uniformly upon all selected jacks (and therefore uniformly upon all the sinkers of said selected jacks).

I have already referred to the pawl carrier 24 as operating the ratchet 26 through the pawls 27, 28. Said pawl carrier 24 is, as stated, oscillated by the rod 25 which, as shown most clearly in Fig. 1, is pivotally connected at 72 (see Fig. 1) to the upper end of a vertical lever 73 pivoted at 74 upon a bracket 75 secured to the framing of the machine. Said lever 73 has secured thereto a cam plate 76 which is in position to be acted upon by a roll or rolls upon the "104" gear 9. Desirably said gear 9 has secured to one face thereof a plate 76' carrying, in the present embodiment of the invention, two rolls 77, which in turn act upon the edge 78 of the cam plate 76. If desired, four rolls or other number may be employed instead of two.

The upper end of the lever 73 is guided in a longitudinal slot in a bar 79 secured to the bed plate 2, and a spring 80 connected to said lever 73 and to a pin or other part at 81 upon the framing tends to hold said lever 73 in the path of movement of the pin or pins 77.

In this or in any other suitable manner the drum 31, with its twelve disks 32 and an underlying disk 82, is turned step by step so as to present the different formations 33 of the disks 32 to the respective slides 44. In the present embodiment of my invention, I have disclosed forty-eight projections 33 as the possible number of projections upon each disk 32, but obviously, according to the pattern, those projections upon each disk which are not needed for the pattern are broken away.

When my invention is employed for heel and toe work, I move the lever 23 and parts carried thereby out of possible contact with the slides 44, so that the same will not be acted upon thereby. For this purpose, I preferably provide the following mechanism to which, however, my invention is not limited.

Figure 2:
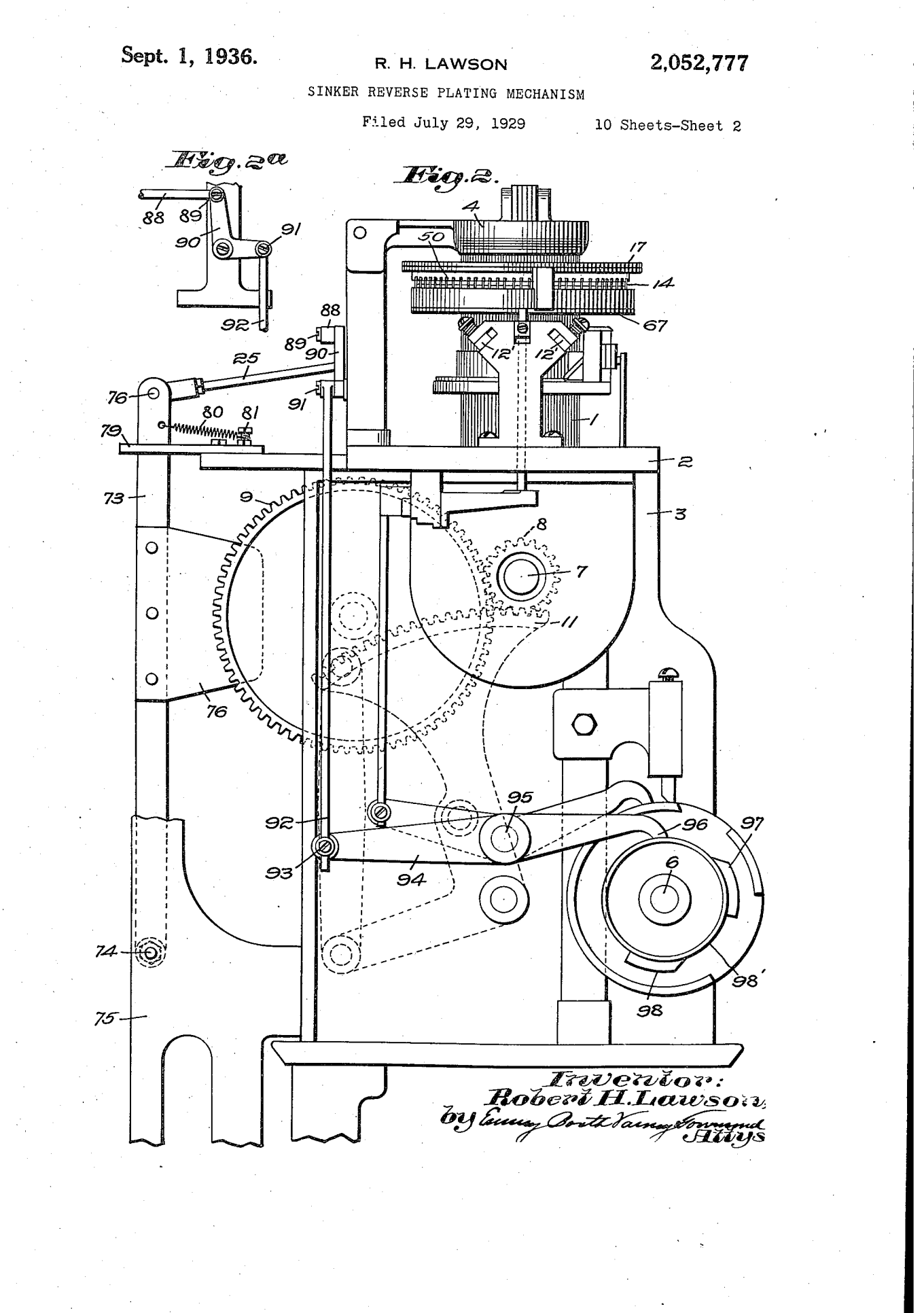

The lever 23, shown in Figs. 6, 7, and elsewhere, is pivotally supported at 83 upon the bracket 20 and carries, as shown, the stud 22 and the drum and other parts pertaining thereto. Said lever 23 has an arc shaped slot 84 receiving a pin 85, and there is provided an adjustable stop screw 86 against which the lever 23 takes when it is returned to position for the leg or the foot by a spring 86a. To the outer end of the lever 23 is pivotally connected at 87 a rod 88, shown also in the detail view, Fig. 2a. Said rod 88 is pivotally connected at 89 to an arm of the bell crank 90 pivoted upon the latch ring bracket and having connected to its other arm at 91 a downwardly extending long rod 92 which, as shown in Fig. 2, is pivotally connected at 93 to one arm of a lever 94 pivoted upon the framing at 95 and having an end or toe 96 adapted to ride upon a heel cam 97 and upon a toe cam 98 upon a suitable drum 98' on shaft 6. The construction is such that for the heel and the toe the pattern drum 31 with its disks 32 is thrown out of action, to be returned at the resumption of circular work.

I provide means to prevent rotative movement of the drum or barrel 31 with its pattern disks 32 when held out of operating position during heel work. While for this purpose any suitable means may be provided, I preferably employ a hook 99, shown most clearly in Fig. 5, which is adapted to take against the edge 100 of the pawl carrying lever 24. To move said hook 99 up into position to engage edge 100 of lever 24, it is mounted upon or formed with a lever 101 pivoted at 102 upon a suitable support. Said lever is provided with a pin 103 with which engages the forked end 104 of another lever 105 suitably pivoted at 106, and at its opposite end 107 it is pivotally connected to a vertical link 108, which, as shown in Fig. 1, is at its lower end pivotally connected at 109 to a lever 110 pivoted upon the framing at 111. Said lever 110 has a toe 112 adapted to ride in the path of a cam 113 whereby the hook 99 is withdrawn from its functioning position at the end of the heel and at the end of the toe.

I provide alternative or additional means for operating the lever 110, and for this purpose have here shown a link 114 pivotally connected at 115 to said lever 110. The lower end of said link 114 is pivotally connected at 116 to a horizontal lever 117 pivoted at 118 to the framing, and at its other end it is pivotally connected at 119 to a link 120 pivotally connected at 121 to a pawl-like member 122 adapted to be lifted by a suitable projection or projections upon the pattern chain or other pattern member. In this manner the hook or like holding device is operated at any desired time in accordance with the pattern indication.

I preferably also provide means whereby at certain times the action of the pattern drum 31 may be speeded up when a less number of projections 33 are used for certain patterns, and in this embodiment of the invention by acting upon the ratchet 26 by two teeth thereof at a time, instead of by one tooth at a time. For this purpose, I have shown the following mechanism.

The pawl carrier lever 24, as shown most clearly in Fig. 4 is provided with a squared stud 123, with which is adapted to engage a shoulder 124 of the pawl 125 pivoted at 126 upon an upright stud 126' mounted on the lever 23. Said pawl is held inward by a coiled spring 127 connected thereto and also to a pin 128 upon the framing. Said pawl 125 has a toe 129 which is adapted to take against the thirteenth or lowermost disk 82 previously referred to, this being the disk which underlies the twelve pattern disks 32. Said disk 82 is provided with suitable projections arranged as desired, and when one of those projections moves the pawl 125 outward upon its pivot, the shoulder 124 of the pawl is released from the stud 123 and the pawl carrier is permitted to move far enough back at each operation to permit the pawl 27 to impart a two-tooth movement to the ratchet 26.

Referring to Fig. 18, the jacks 14 have projections 48, but instead of the upright butt 50 I use an extra projection 50'. When one of the slides 44a is moved in to engage a projection on the jack 14, the nib 14a with its beveled edge 14b will ride up the beveled surface 14c of the web holder bed ring 13, and the shoulder 50a of the jack 14 will come in contact with the end 50b of the sinker 15, as shown in Fig. 19. The projection 50' of the selected jack will ride on the inner vertical face 51a of a cam 60a, and the sinker will be moved into position for reverse plating.

In Fig. 20, instead of projections 48 being on the jacks 14, I have shown them as being on the sinker 15. The projections 48 on the sinkers 15 will be selected by one of the slides 44a, and the sinker 15 will be moved into plating position by the projection 51b engaging the vertical face 51a of a cam 60a, shown in Fig. 21. The nib 14a will be on the sinker 15 instead of on the jack 14, and the beveled surface 14b will engage the beveled surface of the bed ring 13.

It will be understood from the foregoing description that I have provided means preferably intended for use in effecting reverse plating, but which may be used in effecting other stitch variations, such, for example, as drop stitch work, or other stitch variations involving the use of members movable transversely with respect to the needles and adapted to cooperate therewith in effecting stitch variation. My invention contemplates both mechanism and process for the purposes hereinbefore indicated, whether used in circular or straight or other machines of an independent needle type.

Having thus described one illustrative embodiment of my invention, it is to be understood that although specific terms are employed, they are used in a generic and descriptive sense and not for purposes of limitation, the scope of the invention being set forth in the following claims.

I claim:

1. In an independent needle knitting machine having knitting instrumentalities including needles and sinkers, means adapted to cooperate with certain of the said instrumentalities and including jacks having butts, a single cam adapted to engage the butts and move selected ones of the said jacks to a cooperative relation with certain ones of the said instrumentalities whereby the jacks when engaged by the said single cam communicate to the said certain ones of the said instrumentalities movements differentiated with respect to the usual stitch forming and knocking-over movements thereof, and means for selecting desired ones of the said jacks by raising them so that their butts will be positioned for engagement by the said single cam.

2. A circular, independent needle, knitting machine adapted to have threads fed thereto in a plating relation, said machine having sinkers movable transversely with respect to the needles, jacks respectively cooperating with said sinkers, said jacks having contrasting formations so that they may be selected in accordance with a pattern, a single cam to engage selected jacks for moving the sinkers transversely with respect to the needles, and means for moving the selected jacks into engagement with said cam.

3. A circular, independent needle, knitting machine adapted to have threads fed thereto in a plating relation, said machine having sinkers movable transversely with respect to the needles, jacks respectively cooperating with said sinkers, said jacks having contrasting formations so that they may be selected in accordance with a pattern, a single cam to engage selected jacks for moving the sinkers, and means for lifting the selected jacks into engagement with said cam.

4. A circular, independent needle, knitting machine adapted to have threads fed thereto in a plating relation, said machine having sinkers capable in cooperation with the needles of effecting reverse plating at desired wales, jacks respectively cooperating with the sinkers, a cam upon the sinker ring formation adapted to impart functioning movement to each and every selected jack, and means to move selectively jacks into cooperating engagement with said cam.

5. A circular, independent needle, knitting machine adapted to have threads fed thereto in a plating relation, said machine having sinkers capable, in cooperation with the needles, of effecting reverse plating at desired wales, jacks respectively cooperating with the sinkers and in the same groove with the sinkers respectively, a cam upon the sinker ring formation adapted to impart functioning movement to each and every selected jack, and means to move selectively jacks into cooperating engagement with said cam.

6. A circular, independent needle, knitting machine adapted to have threads fed thereto in a plating relation, said machine having sinkers capable, in cooperation with the needles, of effecting reverse plating at desired wales, jacks respectively cooperating with the sinkers, a cam upon the sinker ring formation adapted to impart functioning movement to each and every selected jack, and means to lift selected jacks into functioning engagement with said cam.

7. A circular, independent needle, knitting machine adapted to have threads fed thereto in a plating relation, said machine having sinkers capable, in cooperation with the needles, of effecting reverse plating at desired wales, jacks respectively cooperating with the sinkers, a cam upon the sinker ring formation adapted to impart functioning movement to each and every selected jack, and means to lift selected jacks into functioning engagement with said cam, said jacks having among themselves contrasting formations, and pattern means for acting upon said respective formations.

8. A circular, independent needle, knitting machine adapted to have threads fed thereto in a plating relation, said machine having sinkers adapted to effect reverse plating, jacks respectively cooperating with said sinkers and adapted to cause reverse plating movements of said sinkers, said jacks having depending portions with contrasting formations, a plurality of members corresponding in number with the maximum of said contrasting formations, and pattern means to act upon said members.

9. A circular, independent needle, knitting machine adapted to have threads fed thereto in a plating relation, said machine having sinkers adapted to effect reverse plating, jacks respectively cooperating with said sinkers and adapted to cause reverse plating movements of said sinkers, said jacks having depending portions with contrasting formations, a plurality of members corresponding in number with the maximum of said contrasting formations, pattern means to act upon said members, and means to throw said pattern means out of operation at desired times.

10. A circular, independent needle, knitting machine adapted to have threads fed thereto in a plating relation, said machine having sinkers adapted to effect reverse plating, jacks respectively cooperating with said sinkers and adapted to cause reverse plating movements of said sinkers, said jacks having depending portions with contrasting formations, a plurality of members corresponding in number with the maximum of said contrasting formations, pattern means to act upon said members, means to throw said pattern means out of operation at desired times, and means for holding said pattern means from movement while out of operative position.

11. A circular, independent needle, knitting machine having thread feeding means, sinkers movable transversely with respect to the needles, jacks respectively cooperating with said sinkers, means for selecting jacks, a single cam upon the knitting head with which all of said selected jacks are brought into functioning relation when selected so as thereby to cause movement of the respective sinkers for stitch variation, and pattern means for selecting said jacks.

12. A circular, independent needle, knitting machine having thread feeding means, sinkers movable transversely with respect to the needles, jacks respectively cooperating with said sinkers, means for selecting jacks, a single cam upon the knitting head with which all of said selected jacks are brought into functioning relation when selected so as thereby to cause movement of the respective sinkers for stitch variation, and pattern means for selecting said jacks, said jacks having contrasting formations upon which respectively act members of the pattern means.

13. A circular, independent needle, knitting machine having thread feeding means, sinkers movable transversely with respect to the needles, jacks respectively cooperating with said sinkers, means for selecting jacks, a single cam upon the knitting head with which all of said selected jacks are brought into functioning relation when selected so as thereby to cause movement of the respective sinkers for stitch variation, and pattern means for selecting said jacks, said pattern means comprising a rotating member having formations and members individually moved by formations on the pattern means to select the jacks.

14. A circular, seamless hosiery, independent needle, knitting machine having means for feeding threads thereto in a plating relation, sinkers adapted to cooperate with the needles in effecting reverse plating, and mounted for radial movement in the sinker ring, jacks, one for each sinker and also radially movable, said jacks having contrasting formations adapted to be acted upon by pattern mechanism, and a single cam upon the sinker cam ring and into functioning engagement with which each and every selected jack is adapted to be brought.

15. A circular, seamless hosiery, independent needle, knitting machine having means for feeding threads thereto in a plating relation, sinkers adapted to cooperate with the needles in effecting reverse plating, and mounted for radial movement in the sinker ring, jacks, one for each sinker and also radially movable, said jacks having contrasting formations adapted to be acted upon by pattern mechanism, a single cam upon the sinker cam ring and into functioning engagement with which each and every selected jack is adapted to be brought, and means for lifting each selected jack into functioning engagement with said single cam, whereby the sinker corresponding to each selected jack is caused by sinker cam means to move radially inward at such time as to effect reverse plating at the needle corresponding to said sinker.

16. A circular, seamless hosiery, independent needle, knitting machine having means for feeding threads thereto in a plating relation, sinkers adapted to cooperate with the needles in effecting reverse plating, and mounted for radial movement in the sinker ring, jacks, one for each sinker and also radially movable, said jacks having contrasting formations adapted to be acted upon by pattern mechanism, a single cam upon the sinker cam ring and into functioning engagement with which each and every selected jack is adapted to be brought, and means for lifting each selected jack into functioning engagement with said single cam, whereby the sinker corresponding to each selected jack is caused by sinker cam means to move radially inward at such time as to effect reverse plating at the needle corresponding to said sinker, and pattern mechanism including a drum and a plurality of slides for acting selectively upon said jacks.

17. A knitting machine including a needle bed and a transversely slotted sinker head, sinkers movable transversely of the needle bed and mounted for such movements in the slots of the sinker head, sinker selecting instrumentalities individual to the sinkers and having conformations to be selectively acted upon thereby to effect a preliminary movement of some of the sinker selecting instrumentalities so that selected ones of said instrumentalities may be engaged and advanced by a fixed cam, the advance movements of the instrumentalities being communicated to the companion sinkers, the sinker engaging instrumentalities being disposed within the slots of the sinker heads and beneath the sinkers and said instrumentalities having portions extending substantially at right angles to the portions thereof engaged within the slots of the sinker head, the said right angled portions of the instrumentalities having conformations to be selectively acted upon by other elements whereby the instrumentalities are selected for engagement by the fixed cam.

18. A jack for use in a knitting machine comprising a portion thereof having a series of removable selective projections and having a portion extending at right angles to the first named portion, the jack having a butt extending at right angles to the said projections and to be engaged by a fixed cam.

19. A jack for use in a knitting machine comprising a portion thereof having a series of removable selective projections and having a portion extending at right angles to the first named portion, the jack having a butt extending at right angles to the said projections and to be engaged by a fixed cam, a shoulder on the jack for engagement with a knitting instrumentality for selective action thereof determined by the removable projections and cams or other elements acting thereupon.

20. A jack for use in a knitting machine comprising a portion thereof having a series of removable selective projections and having a portion extending at right angles to the first named portion, the jack having a butt extending at right angles to the said projections and to be engaged by a fixed cam, a shoulder on the jack for engagement with a knitting instrumentality for selective action thereof determined by the removable projections and cams or other elements acting thereupon, the jack also having a shoulder forwardly of the shoulder first mentioned, the last mentioned shoulder preventing unintentional removal of the said jack from the knitting machine.

21. A knitting machine having knitting instrumentalities and pattern mechanism for selectively acting upon the said knitting instrumentalities, said pattern mechanism including a rotary pattern member having a plurality of series of projections each series being at a different level, a series of movable members operatively disposed between the pattern member and the knitting instrumentalities acted upon, each said movable member being in a position to be acted upon by any one of a series of projections carried by the pattern member and each movable member being adapted in turn to act upon certain of the knitting instrumentalities to impart movements thereto transversely of the needle bed to cause some of the knitting instrumentalities engaged by the yarn in the drawing of stitches, to be moved and effect stitch variation, in combination with means for variably advancing the said rotary pattern member.

22. A knitting machine having knitting instrumentalities and pattern mechanism for selectively acting upon the said knitting instrumentalities, said pattern mechanism including a rotary pattern member having a plurality of series of projections each series being at a different level, a series of movable members operatively disposed between the pattern member and the knitting instrumentalities acted upon, each said movable member being in a position to be acted upon by any one of a series of projections carried by the pattern member and each movable member being adapted in turn to act upon certain of the knitting instrumentalities to impart movements thereto transversely of the needle bed to cause some of the knitting instrumentalities engaged by the yarn in the drawing of stitches, to be moved and effect stitch variation, in combination with means for variably advancing the said rotary pattern member, the said means for variably advancing the rotary pattern member including a pawl and an element movable to and from a co-operative position with respect to the pawl so that the pawl may variably advance the rotary pattern member.

ROBERT H. LAWSON.